United States Patent Office 3,340,949
Patented Sept. 12, 1967

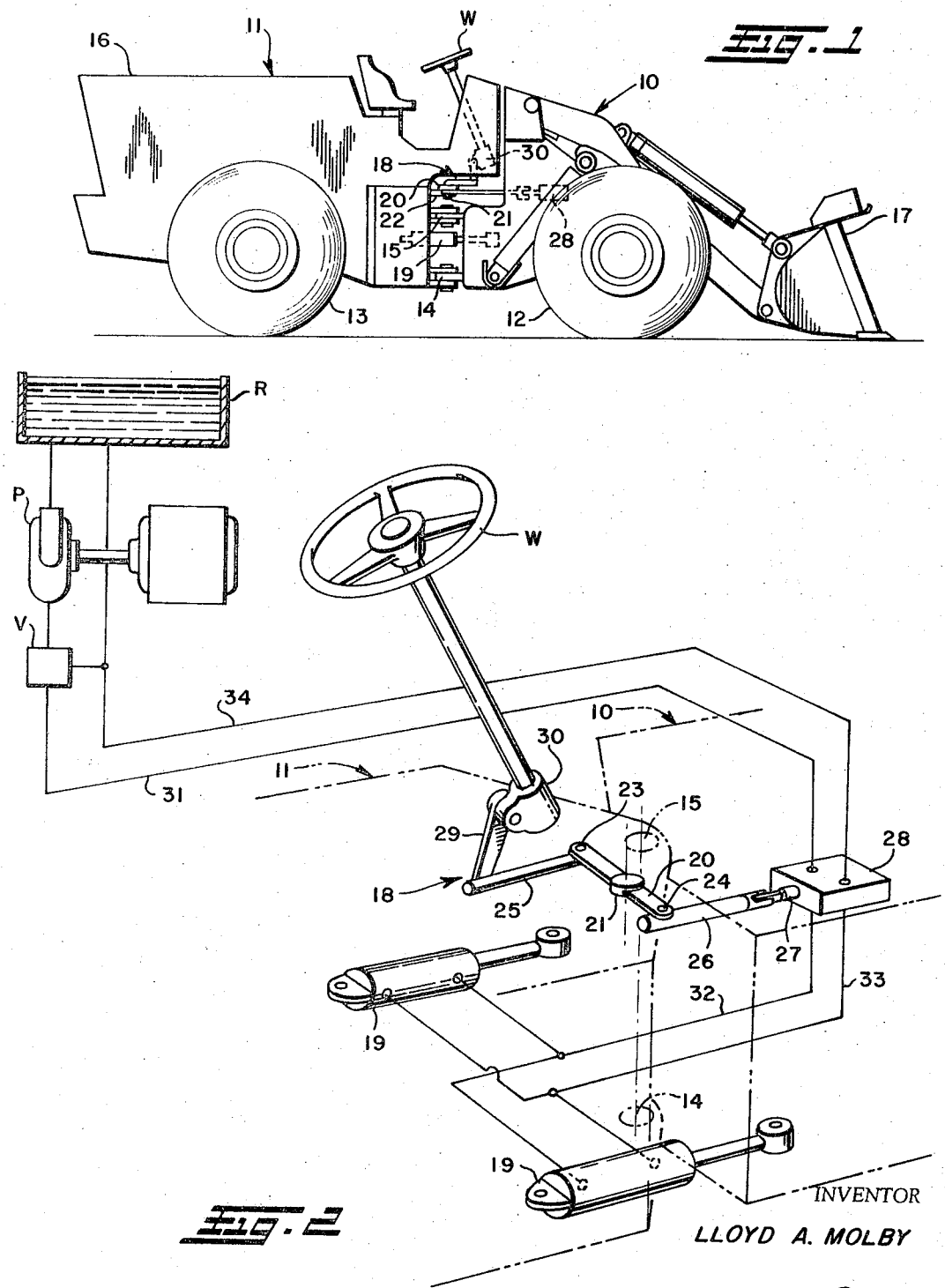

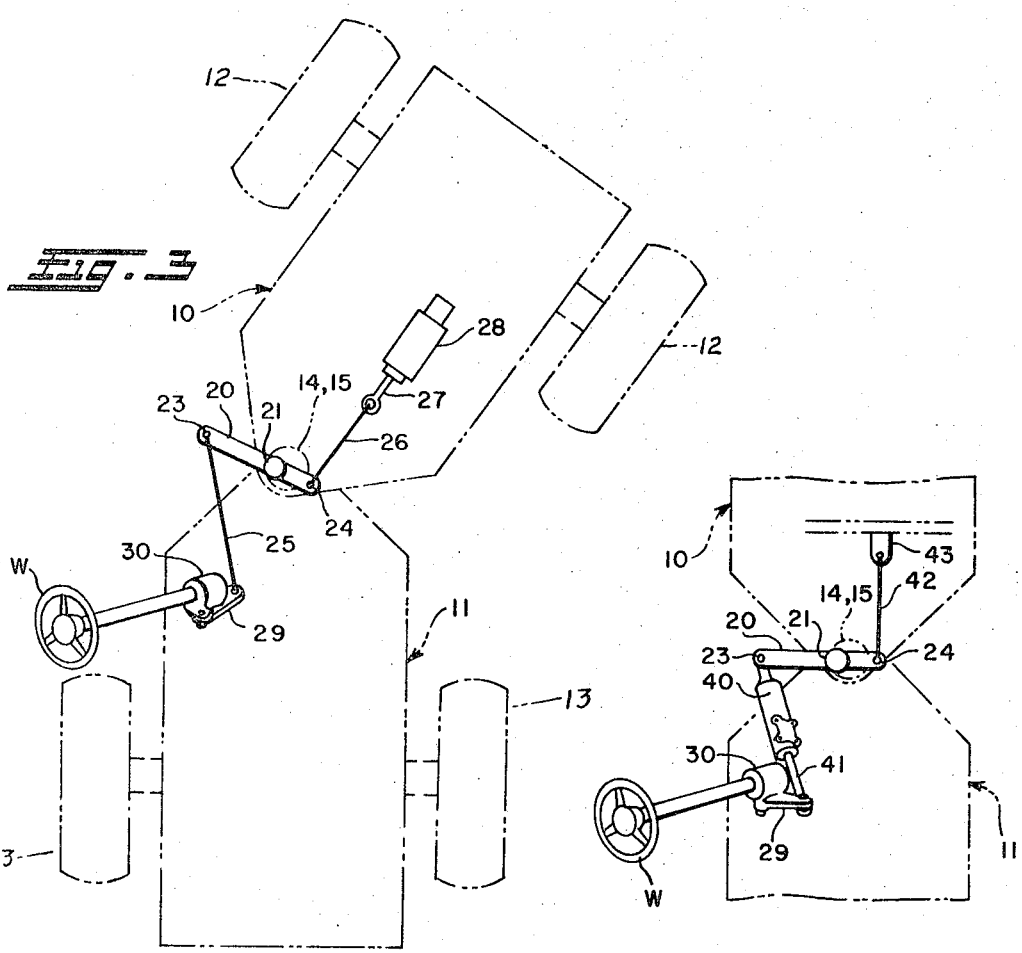
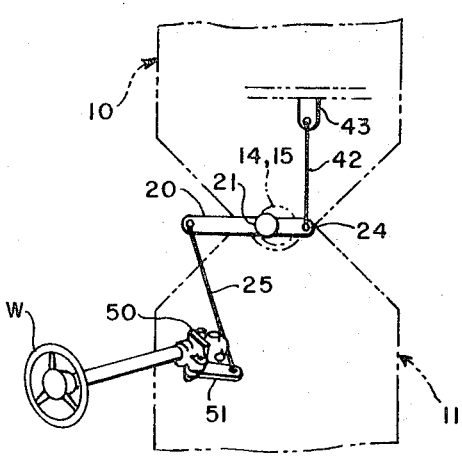

3,340,949
VARIABLE RATE STEERING FOR ARTICULATED VEHICLE
Lloyd A. Molby, Elba, N.Y., assignor to Eaton Yale & Towne Inc., Cleveland, Ohio, a corporation of Ohio
Filed June 23, 1966, Ser. No. 559,884
16 Claims. (Cl. 180—79.2)

This invention relates to a variable rate steering mechanism especially adapted for use on a vehicle having an articulated construction.

As those skilled in the art will appreciate, many heavy vehicles, such as shovel loaders, are formed through the assembly of a forward wheeled portion and a rear wheeled portion to one another on a vertical pivot. Through the use of power steering means such as hydraulic rams, the forward and rear portions of the vehicle are moved relatively to one another about the vertical axis of the pivot to contribute steering. In other words, the vertical axis becomes the steering axis for the vehicle. It is customary to control the hydraulic rams through a steering wheel that is mounted on one of the portions of the vehicle, and a valve that is operated by the steering wheel for directing fluid pressure to the rams.

My invention relates to particularly to the control of the power steering means so that the rate of steering will increase as the two portions of the vehicle move relatively to one another during the steering movement.

As a feature of my invention, I utilize a series of parts that are connected for movement relatively to one another, opposed ends of the series being secured to the two portions of the vehicle, and a manually movable steering valve or other controller that forms a part of said series of parts. I then mount a medial part of said series of parts for movement bodily with one of the vehicle portions, so as to apply to the valve or controller a movement which is in addition to its manual movement.

As a particular feature of my invention, I utilize a mounting device carried by one of the two portions of the vehicle and movable with that portion as the two portions rotate about the steering axis. On the mounting device, a control member for the steering controller is supported in spaced relation to the steering axis, so as to move bodily about that axis as the portions of the vehicle are steered. The control member is connected to the two portions of the vehicle, so that the control member will receive valve controlling motion not only from the mounting device on which it is supported, but also from the vehicle portions as they are steered.

I believe that the concept I have thus set forth is not only new and novel, but that it contributes an extremely valuable function while utilizing means that actually are quite simple.

I have thus outlined rather broadly the important features of my invention in order that the detailed description thereof may be better understood and in order that my contribution in the art may be better appreciated. There are, of course, additional features of my invention that will be described hereinafter and which will form the subject of the claims appended hereto. Those skilled in the art will appreciate that the conception on which my disclosure is based may readily be utilized as a basis for designing of other structures for carrying out the several purposes of my invention. It is important, therefore, that the claims be regarded as including such equivalent constructions as do not depart from the spirit and scope of my invention, in order to prevent the appropriation by those skilled in the art.

Referring now to the drawings:

FIG. 1 shows a side view of an articulated shovel loader that utilizes my novel variable rate steering mechanism.

FIG. 2 shows a diagrammatic view of a preferred form of my steering mechanism.

FIG. 3 shows a diagrammatic view which is drawn to illustrate a steered position of my mechanism.

FIGS. 4 and 5 are diagrammatic views showing further forms of my steering mechanism.

For the purpose of describing my invention, I show in FIG. 1 an articulated shovel loader including a forward portion 10 and a rear portion 11 that are equipped with traction wheels 12, 13, and that are connected through pivot pins 14, 15 arranged in a vertical axis. The rear portion 11 has a compartment 16 in which is an engine that forms a source of power for the loader, and the forward portion 10 supports a materials handling bucket 17. Actually, details of the loader are not important to an understanding of my invention, and it is merely necessary to know here that my invention is adapted for use on a vehicle having forward and rear portions that steer by articulating about a vertical pivot.

I indicate my novel steering mechanism generally by the numeral 18 in FIG. 1. The rear portion 11 of the vehicle is equipped with a steering wheel W that an operator will utilize for controlling the mechanism 18 so as to operate power steering means such as a pair of hydraulic rams 19, one of those rams being seen in FIG. 1. Those persons skilled in the art will appreciate that the hydraulic rams 19 will be so pivoted between the portions 10, 11 of the vehicle that extending and retracting movements of the rams will rotate those portions to steer the vehicle.

As shown in FIG. 1, my steering mechanism 18 includes a control member 20 that is mounted to rotate on one of the vehicle portions 10, 11, as through a pivot 21 on a mounting device 22 supported on the rear vehicle portion 11. The control member 20 and its pivot 21 have a particular arrangement that will be best understood when referring to the diagrammatic views shown in FIGS. 2 and 3. Thus, I prefer to form control member 20 as a lever, and I particularly arrange the axis of pivot 21 so as to be somewhat spaced in a lateral direction relative to the axis of the pivot pins 14, 15, about which the vehicle portions articulate. Because the pivot 21 of control member 20 is mounted relatively to the rear vehicle portion 11, that pivot will move in relation to the forward vehicle portion 10 when the portions 10, 11 are steered about the axis of pivots 14, 15, as is illustrated in FIG. 3 of the drawings. That will cause a bodily movement of control member 20. Naturally, the member 20 may in addition rotate about its pivot 21.

Still referring to FIGS. 2 and 3, opposed portions of the control member 20 are connected through pivots 23, 24 to links 25, 26. The link 25 is connected through a pitman arm 29 to a steering gear 30 that is mounted on the rearward vehicle portion 11, and that will be operated by the steering wheel W. Link 26 is attached to the spool 27 of a steering valve 28 that is mounted on the forward vehicle portion 10. I prefer to utilize for the valve 28 a standard valve of an open center type that will pass high pressure fluid to a low pressure line when valve spool 27 is in a neutral position, the spool when moved in either direction applying the high pressure to a corresponding end of the steering rams 19. Merely for purposes of disclosure, I show in FIG. 2 a motor driven pump P supplied with fluid from a reservoir R and applying fluid pressure through a pressure control valve V and a high pressure line 31 to the steering valve 28, there being lines 32, 33 through which valve spool 27 will direct the fluid pressure to either end of the rams 19. A line 34 will direct low pressure fluid from valve 28 to reservoir R. Actually, it will be possible to utilize steering valves of types other than that I have mentioned, and therefore I do not wish to be limited by a particular steering valve.

The steering wheel W may act through steering gear 30, pitman arm 29 and link 25 to impart simple rotating movements to the control member 20 on its pivot 21, causing line 26 to move the valve spool 27. Thus, when we merely consider the simple rotating movements of the control member 20, we see that the steering wheel W would effect rather usual steering control through valve 28. However, we also must consider the fact that control member 20 will move bodily as the steering rams 19 steer the vehicle portions 10, 11 relatively to each other. Now, as the rams 19 steer, the movements that are imparted to valve spool 27 will be a resultant of the simple rotation of control member 20 together with the bodily movements of that member.

In other words, steering wheel W will fully control the steering movements of the vehicle, but at a rate which actually will depend upon the steered position of the vehicle. The arrangement is such that a particular rotating movement of steering wheel W will move the valve spool 27 farther as the vehicle portions 10, 11 are steered farther away from longitudinally aligned position. That will contribute variable rate steering which will be relatively slow while the vehicle portions 10, 11 are near their aligned position, but that will enable steering wheel W to effect faster steering as the vehicle portions 10, 11 are steered toward sharper angles. While the vehicle portions 10, 11 move to a steered position, the mechanism including control member 20 will operate to return the valve spool 27 to neutral, but the rate of operation naturally will vary as the vehicle portions are steered.

In FIG. 4 of the drawings, I show my invention in a further form in which a steering valve 40 is arranged between the control member 20 and the steering gear 30 on the rear vehicle portion 11. Thus, valve 40 is connected to pivot 23 on member 20, and the spool 41 of valve 40 is pivoted to the pitman arm 29 on the steering gear. I then utilize a link 42 that connects the pivot 24 on member 20 to a pivotal mounting 43 that is supported in a fixed position on a part of the forward vehicle unit 10. In the particular form of my invention, the control member 20 will act through the steering valve 40 to effect the same variable rate steering that I have described in connection with the valve 28 shown in FIGS. 1 to 3. That will be understood when it is realized that steering wheel W in FIG. 4 will apply full control to the valve spool 41, while control member 20 will act at a varying rate to move valve 40 as the portions of the vehicle are steered.

Some persons may prefer to utilize a combined steering valve and steering gear that is available, and in FIG. 5 I show such a valve and gear at 50 on the rear vehicle portion 11. Steering wheel W then will control valve 50 to effect steering, while control member 20 will act through link 25 and pitman arm 51 to apply further control to valve 50. The particular arrangement utilizes the link 42 to connect control member 20 to the forward vehicle portion 10. Control member 20 then will cause valve 50 to control the steering at a variable rate, as I have described.

I call attention to the fact that it is not essential to my invention that a steering valve be connected in a particular manner to the control member 20, and it is conceivable that a steering valve may be utilized in arrangements other than those that I have described. Also, while I have referred to means that will mount the control member 20 on the rear vehicle portion 11, it is merely necessary that control member 20 be so mounted on one of the vehicle portions as to move bodily when the portions are steered. It is important to understand simply that there is a manually operated steering controller, such as a valve, that forms a part of a series of parts extending between two portions of the vehicle that are steered relatively to each other, there being means that mount a medial part of the series for bodily movement with one of the portions of the vehicle.

Those persons skilled in the art naturally appreciate the advantages that are contributed by variable rate steering, since an operator then may have very effective steering control while a vehicle moves at a relatively high speed, yet the vehicle may be more easily and quickly controlled while maneuvering at lower speed. Also, the operator need rotate the steering wheel through fewer turns when steering between extreme positions. The novel steering control of my invention enables me to achieve variable rate steering that will be extremely satisfactory, yet my concept will merely require a small number of parts that actually are quite simple. I believe, therefore, that the considerable value of my novel steering control will be fully understood, and that the merits of my invention will be appreciated.

I now claim:

1. In a vehicle of the class described, forward and rear portions pivoted to one another for steering movement about a vertical axis, power steering apparatus for pivoting said forward and rear portions relatively to one another in said vertical axis, a control for said power steering apparatus comprising a mounting device secured for rotation with one of said vehicle portions in said steering axis, a control member for said power steering apparatus, means movably mounting said control member at a point on said mounting device that is spaced from said vertical axis, a steering wheel, means connecting said control member to said steering wheel and to one of said portions of the vehicle so as to move said control member on said mounting device incidental to movements between said wheel and said one vehicle portion, and said control member being moved as a resultant of the movement of said mounting device as that device rotates with its corresponding vehicle portion in the steering axis.

2. In the combination of claim 1, the feature that said mounting device is fixed to one of said portions of the vehicle and has a pivot displaced from the vertical steering axis, and that said control member is a lever mounted on said pivot and pivotally connected to said steering wheel.

3. In the combination of claim 1, the feature that said mounting device is fixed to one of said portions of the vehicle and has a pivot displaced from the vertical steering axis, and that said control member is a lever mounted on said pivot, there being a control valve for said power steering apparatus, and means pivotally connecting said lever to said steering wheel and to said control valve.

4. In the combination of claim 1, the feature that said steering wheel is mounted on one of said portions of the vehicle and that said mounting device is supported on the portion with which it rotates.

5. In the combination of claim 4, the feature that each of said portions of the vehicle is mounted on wheels and that said power steering apparatus includes hydraulic rams extending between said portions, and said steering control including a valve that controls operation of the rams and that is actuated through said control member by the steering wheel and also actuated by the steering movements between said portions of the vehicle.

6. In a vehicle having a manually movable steering controller for controlling power that is directed to power means for steering the vehicle, said power means acting between two portions of the vehicle that rotate relatively to each other about a steering axis, and there being further means through which said portions of the vehicle will act to move the steering controller incidental to the steering rotation between said portions, the improvement that comprises said further means including a series of parts pivoted in consecutive order and extending between the two portions of the vehicle, each of said pivots being displaced from the steering axis, opposed end parts being secured to said vehicle portions, means so connecting the steering controller as to form a part of said series of parts, and including means mounting a medial part of said series for movement with one of the portions of the vehicle, whereby to act as those portions are steered to vary the rate at which the steering controller will control the steering power.

7. A construction as set forth in claim 6, in which said means mounting the medial part of the series include a portion supporting said medial part for movement relatively to said one portion of the vehicle and also for bodily movement with said one vehicle portion.

8. A construction as set forth in claim 6, and including a lever that forms said medial part of the series of parts, and the mounting for said lever comprising a pivot arranged at a point displaced from the steering axis on said one portion of the vehicle.

9. A construction as set forth in claim 8, in which the steering controller forms one of said opposed end parts of the series secured to the vehicle portions, and a link forming the other of said opposed end parts and connected to said lever.

10. In a vehicle having a steering valve for controlling hydraulic pressure that is directed to a hydraulic ram for steering the vehicle, said ram acting between two portions of the vehicle that rotate relatively to each other about a steering axis, manual means for operating said valve, and there being further means through which said vehicle portions will act to operate the steering valve incidental to the steering rotation between said portions, the improvement that comprises a control lever lying generally in a transverse position on the vehicle and forming a part of said further means, pivot means engaging a medial part of said lever and mounting said lever for rotation on one of said portions of the vehicle, and said pivot means being arranged in laterally displaced relation to said steering axis so that the control lever will move bodily also with said one portion of the vehicle whereby to act as the vehicle portions are steered to vary the rate at which the steering valve will control the steering hydraulic pressure.

11. A construction as set forth in claim 10, in which said control lever is connected to said steering valve and said further means including a link through which said lever is connected to the other of said vehicle portions.

12. A construction as set forth in claim 10, in which said steering valve and said manual means for operating the valve are mounted on opposed portions of the vehicle, and including links forming parts of said further means and connecting said lever to said steering valve and to the manual means for operating the valve.

13. In a vehicle of the class described, including two portions pivoted to one another for steering movement about a vertical axis, a hydraulic ram for pivoting said portions in said axis to steer the vehicle, a manually controlled steering valve for directing fluid pressure to said hydraulic ram to steer the vehicle, a movable control member mounted at a point that is in laterally displaced relation to the steering axis on a portion of the vehicle, means connecting said movable control member to one of said portions of the vehicle and through said valve to the other vehicle portion so as to apply to the steering valve a control that is incidental to steering movements between the two vehicle portions, and said control member effective by the point of its mounting to vary the control that may be applied to the steering valve as the vehicle is steered.

14. A construction as set forth in claim 13, and including a lever forming said control member, and a pivot on which the lever is supported at said laterally displaced point so that the lever may rotate and also move bodily as the vehicle portions pivot in the steering axis.

15. A construction as set forth in claim 14, and including links through which said lever is connected to said one vehicle portion and to said valve.

16. A construction as set forth in claim 13, in which the mounting for said movable control member comprises a pivot on which the member may rotate about said laterally displaced point, and the connecting means for the control member including manually operated steering gear mounted on said one vehicle portion, a link extending between said steering gear and control member, the steering valve being mounted on said other vehicle portion, and a link connecting said control member and said valve.

References Cited
UNITED STATES PATENTS

| | | | |
|---|---|---|---|
| 2,896,734 | 7/1959 | Toth | 180—79.2 |
| 3,151,694 | 10/1964 | Rogers | 180—79.2 |
| 3,159,230 | 12/1964 | Gordon | 180—79.2 |
| 3,292,725 | 12/1966 | Hlinsky | 180—79.2 |

BENJAMIN HERSH, *Primary Examiner.*

JAMES H. BRANNEN, *Assistant Examiner.*